United States Patent
McCarroll

(10) Patent No.: US 6,782,477 B2
(45) Date of Patent: Aug. 24, 2004

(54) METHOD AND SYSTEM FOR USING TAMPERPROOF HARDWARE TO PROVIDE COPY PROTECTION AND ONLINE SECURITY

(75) Inventor: William M. McCarroll, San Diego, CA (US)

(73) Assignee: Song Computer Entertainment America Inc., Foster City, CA (US)

(*) Notice: Subject to any disclaimer, the term of this patent is extended or adjusted under 35 U.S.C. 154(b) by 12 days.

(21) Appl. No.: 10/123,923

(22) Filed: Apr. 16, 2002

(65) Prior Publication Data

US 2003/0196102 A1 Oct. 16, 2003

(51) Int. Cl.[7] .............................. H04L 9/00; G06F 11/30
(52) U.S. Cl. ...................... 713/189; 713/176; 713/194
(58) Field of Search ................................ 713/189, 194, 713/176

(56) References Cited

U.S. PATENT DOCUMENTS

| | | | | |
|---|---|---|---|---|
| 4,593,384 A | * | 6/1986 | Kleijne ........................ | 365/228 |
| 5,689,565 A | * | 11/1997 | Spies et al. ................. | 713/189 |
| 5,956,408 A | * | 9/1999 | Arnold ........................ | 713/189 |
| 5,991,399 A | * | 11/1999 | Graunke et al. ............. | 380/279 |
| 6,021,202 A | * | 2/2000 | Anderson et al. ........... | 705/54 |
| 6,175,925 B1 | * | 1/2001 | Nardone et al. ............. | 713/200 |
| 6,205,550 B1 | * | 3/2001 | Nardone et al. ............. | 713/200 |
| 6,292,569 B1 | * | 9/2001 | Shear et al. ................. | 380/255 |
| 6,389,538 B1 | * | 5/2002 | Gruse et al. ................. | 713/194 |
| 6,567,917 B1 | * | 5/2003 | Ziese ........................... | 713/187 |

OTHER PUBLICATIONS

International Search Authority; "Notification of the International Search Report"; "PCT International Search Report"; cited in corresponding PCT application for U.S. application No. 10/123,923; date of mailing Jun. 24, 2003; (5 pages).
Sony Corporation; "Memory Stick Copyright Protection Technology—MagicGate—Key Technology for Digital Content"; Cx–News Sony Semiconductor News Magazine; Copyright 2002; pp. 1–6; vol. 20; Internet address: http://www.sony.net/Products/SC–HP/CXPAL/CXNEWS–20/PDF/TW.pdf.

* cited by examiner

Primary Examiner—Gilberto Barron
Assistant Examiner—Kambiz Zand
(74) Attorney, Agent, or Firm—Fitch, Even, Tabin & Flannery

(57) ABSTRACT

A system includes an associated tamperproof circuit that contains a cryptography unit and one or more keys. The system receives software having one or more portions of code that have been digitally signed prior to receipt of the code by the system. The cryptography unit and one of the keys contained in the tamperproof circuit are used to decrypt a signature file for a portion of the code. The validity of the portion of code is determined by using the decrypted signature file, and if the portion of code is invalid, operation of the system is prevented. One or more portions of the code received by the system, such as a communications protocol, may also be encrypted prior to receipt of the code by the system. The system obtains a key from a remote server via a secure communications channel and uses the key and the cryptography unit contained in the tamperproof circuit to decrypt the communications protocol. The system then uses the communications protocol to communicate across a network with another client, such as to play an online game.

38 Claims, 7 Drawing Sheets

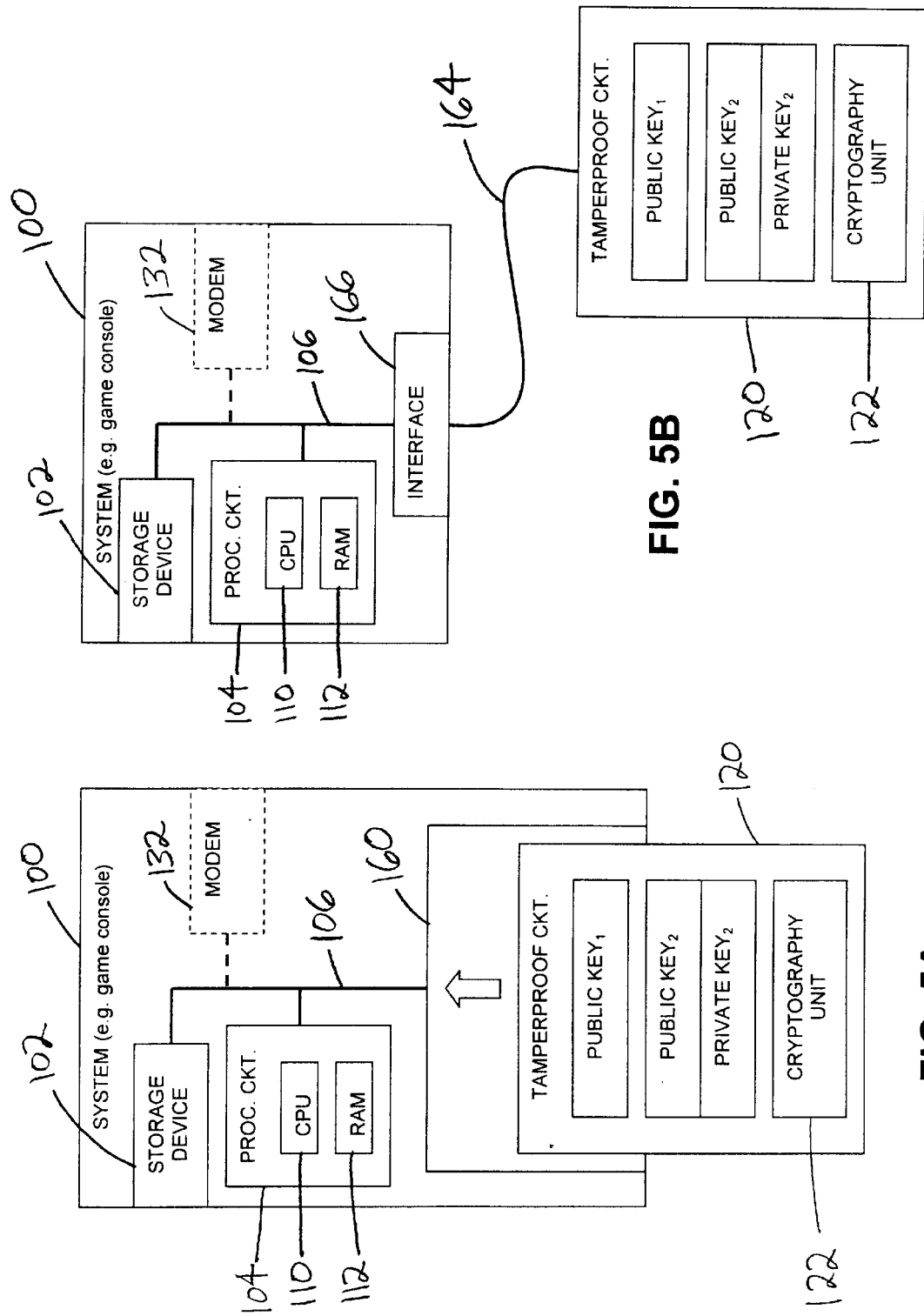

METHOD AND SYSTEM FOR USING TAMPERPROOF HARDWARE TO PROVIDE COPY PROTECTION AND ONLINE SECURITY

BACKGROUND OF THE INVENTION

1. Field of the Invention

The present invention relates generally to software copy protection and schemes for securing communication protocols, and more specifically, to the use of a tamperproof hardware cryptography circuit to ensure the integrity of copy protection and to secure communication protocol messages and structures used in online communications, such as online games.

2. Discussion of the Related Art

Computer entertainment game systems, such as the Sony PlayStation® and PlayStation® 2, have become some of the most successful consumer electronics products to hit store shelves in recent years. Unfortunately, along with such success comes the increased potential for abuse by those who seek to improperly tamper with the systems and associated software. Such abuse is motivated by a warped desire among some to modify certain games in certain ways to achieve peculiar or unusual results, and perhaps even to profit illegally from the sale and/or distribution of such modified software. Clearly, one of the issues that is of major concern to game publishers is the piracy of their software because such modifications can lead to circulation of inconsistent versions of software among the public, which can cause confusion and even damage to the reputation and integrity of game publishers.

There is also a potential for abuse with respect to online or network enabled game systems. For example, a hacker or prankster may perform a so-called "man in the middle" attack whereby the hacker seeks to intercept a message that is being communicated over a network (e.g. the Internet) between two game systems. The hacker may be motivated by a desire to cheat or to disrupt play of the game by the two legitimate users. Again, such abuse can disadvantageously cause confusion and wreak havoc among innocent users, which can ultimately lead to an unjustified distrust by the public of the systems and games themselves.

It is with respect to these and other background information factors that the present invention has evolved.

SUMMARY OF THE INVENTION

The present invention advantageously addresses the needs above as well as other needs by providing a method of operating a system. The method includes the steps of: reading a portion of software code from a storage device in the system, wherein the portion of software code has been digitally signed with a first key prior to entering the system; sending the portion of the software code to a cryptography unit contained in a tamperproof circuit associated with the system; decrypting a signature file corresponding to the portion of the software code with the cryptography unit using a second key stored in the tamperproof circuit to form a decrypted signature file; determining whether the portion of the software code is valid by using the decrypted signature file; and preventing operation of the system if the portion of the software code is not valid.

In another embodiment, the invention can be characterized as a processor based system that comprises a storage device, a tamperproof circuit, a cryptography unit contained in the tamperproof circuit, and processing circuitry. The processing circuitry is configured to read a portion of software code from the storage device that has been digitally signed with a first key prior to entering the system, and to send the portion of the software code to the cryptography unit. The cryptography unit is configured to decrypt a signature file corresponding to the portion of the software code using a second key stored in the tamperproof circuit, and to determine whether the portion of the software code is valid. The processing circuitry is further configured to prevent operation of the system if the portion of the software code is not valid.

In another embodiment, a method of operating a system comprises the steps of: receiving a first key in the system from a remote server across a network; reading a portion of encrypted code from a storage device in the system; sending the portion of the encrypted code to a cryptography unit contained in a tamperproof circuit associated with the system; decrypting the portion of the encrypted code with the cryptography unit using the first key to form decrypted code; and communicating across the network using the decrypted code.

In another embodiment, a processor based system comprises a storage device, a tamperproof circuit, a cryptography unit contained in the tamperproof circuit, and processing circuitry. The processing circuitry is configured to receive a first key from a remote server across a network, read a portion of encrypted code from the storage device, and send the portion of the encrypted code to the cryptography unit. The cryptography unit is configured to decrypt the portion of the encrypted code using the first key to form decrypted code, and the processing circuitry is further configured to communicate across the network using the decrypted code.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein:

FIGS. 5A, 5B and 5C are block diagrams illustrating alternative configurations of the systems shown in FIGS. 1 and 3.

Corresponding reference characters indicate corresponding components throughout the several views of the drawings.

DETAILED DESCRIPTION OF THE INVENTION

Figure 1:
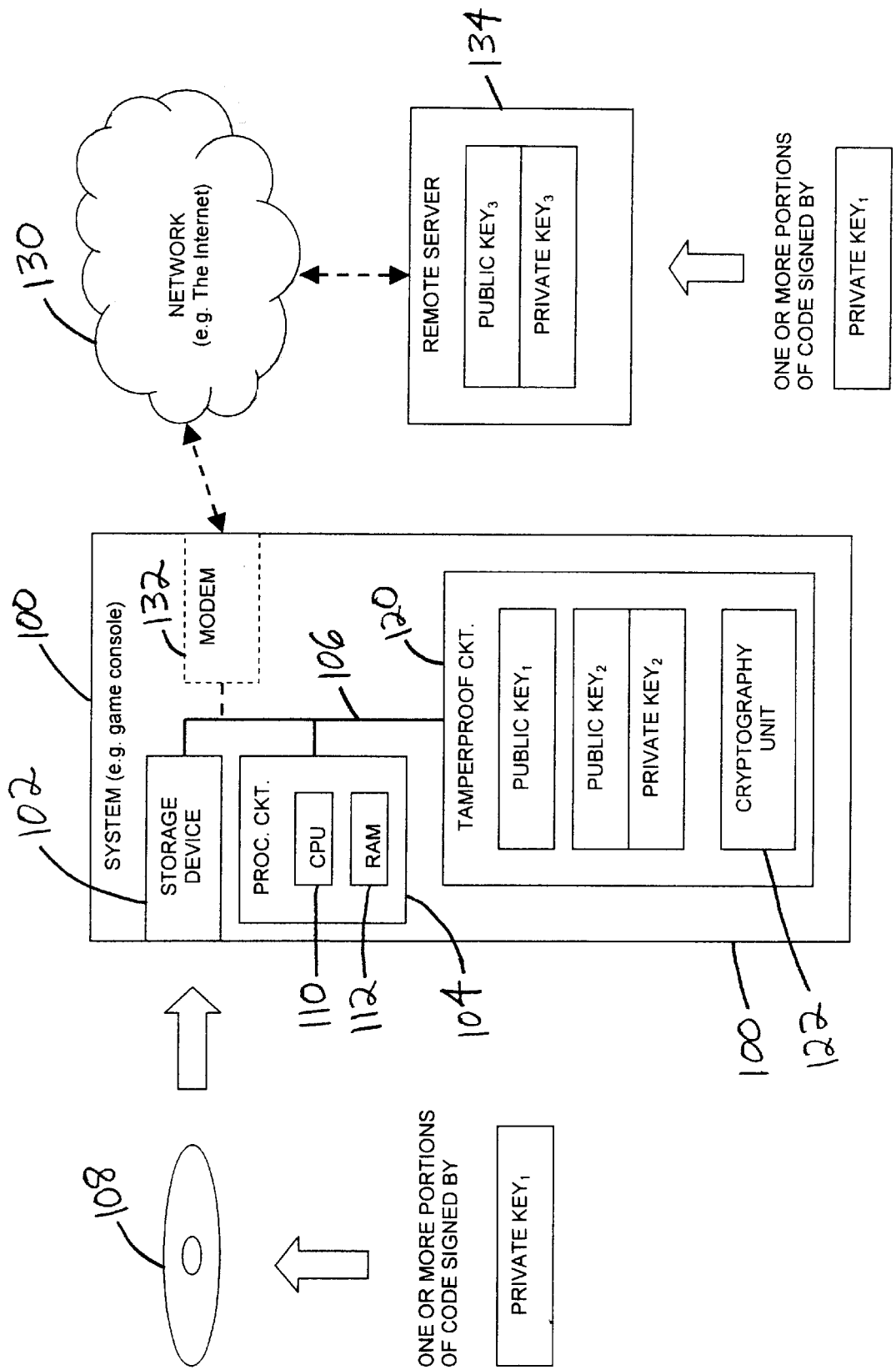
FIG. 1 is a block diagram illustrating a system made in accordance with an embodiment of the present invention.

Referring to FIG. 1, there is illustrated a system 100 made in accordance with an embodiment of the present invention. The system 100 may comprise a game system or console, such as for example past present or future versions of the popular Sony PlayStation®, or any other type of computer system, processing system, game system, or the like, that includes one or more of the features described herein. The system 100 is capable of using currently available commercial cryptography algorithms to decrease the threat of piracy and reverse engineering. Current copy protection techniques are utilized in such a way as to verify the integrity of software through the use of digital signatures.

The system 100 typically includes a storage device 102 and processing circuitry 104 that are interconnected by a main system bus 106. The storage device 102 may comprise any type of storage device having removable computer readable media 108, such as for example, a digital versatile disc (DVD) drive, a compact disc (CD) drive, any other type of optical drive, any type of high capacity disc drive, such as the Zip® drive by Iomega corporation, or the like. The storage device 102 may alternatively comprise a Sony MagicGate™ or Memory Stick® media slot with the removable computer readable media 108 comprising the MagicGate™ or Memory Stick® media. And as will be discussed below, the storage device 102 may alternatively comprise a hard disc drive. The processing circuitry 104 may comprise a central processing unit (CPU) 110 and a random access memory (RAM) 112.

In accordance with the present invention, the system 100 also includes a tamperproof circuit 120. A tamperproof circuit is a type of circuit that destroys itself when somebody tries to modify or tamper with it. The tamperproof circuit 120, which is typically coupled to the system bus 106, may comprise any type of tamperproof circuit such as currently available tamperproof circuits like those found in smartcard technology for digital cash transactions. In this embodiment of the system 100, the tamperproof circuit 120 comprises an internal tamperproof circuit that is hard wired into the system 100 console itself. As will be discussed below, however, the tamperproof circuit 120 could alternatively be implemented as an external or "add-on" component, such as a memory card or PCMCIA card, and may even include additional functionality.

The tamperproof circuit 120 preferably includes a cryptography unit 122. The cryptography (or "crypto") unit 122 may comprise a processor or other circuit dedicated to encrypting and decrypting. By having the crypto unit 122 contained in the tamperproof casing 120, the algorithm used to do the actual decryption is kept fairly safe.

The system 100 uses the cryptography unit 122 inside the tamperproof circuit 120 to ensure the integrity of the copy protection and the integrity of the machine code of system software by the use of digital signatures using public/private key encryption technology. Public/private key encryption technology is a well-known asymmetric scheme that uses a pair of keys (strings of numbers) for encryption. Namely, the public key encrypts data, and a corresponding private, or "secret", key decrypts it. For digital signatures, the process is reversed. Namely, the sender uses the private key to create a unique electronic number that can be read by anyone possessing the corresponding public key, which verifies that the message is truly from the sender. Thus, the user releases the public key to the public, who can use it for encrypting messages to be sent to the user and for decrypting the user's digital signature. The user keeps the private key secret and uses it to encrypt digital signatures and to decrypt received messages. The digital signature scenario is the technology that is preferably used in this first aspect of the present invention.

Therefore, in accordance with an embodiment of the present invention, a public key PUBLIC KEY$_1$ and a public/private key pair PUBLIC KEY$_2$/PRIVATE KEY$_2$ are also contained or stored in the tamperproof circuit 120. The key PUBLIC KEY$_1$ must be the same key for all system units distributed by any given manufacturer that are intended to use media mastered by the key PRIVATE KEY$_1$ (described below). The key pair PUBLIC KEY$_2$/PRIVATE KEY$_2$ are preferably a unique pair of keys for each system unit, but again, this is not required. Because these keys are sealed away in the tamperproof casing 120, they are invisible to everybody, including the users and the game developers themselves. This decreases the likelihood of people inside the game development companies disclosing the keys to outside parties. Furthermore, the tamperproof circuit 120 may include additional keys or pairs of keys just in case the security of one of the keys was ever violated.

Figure 2A:
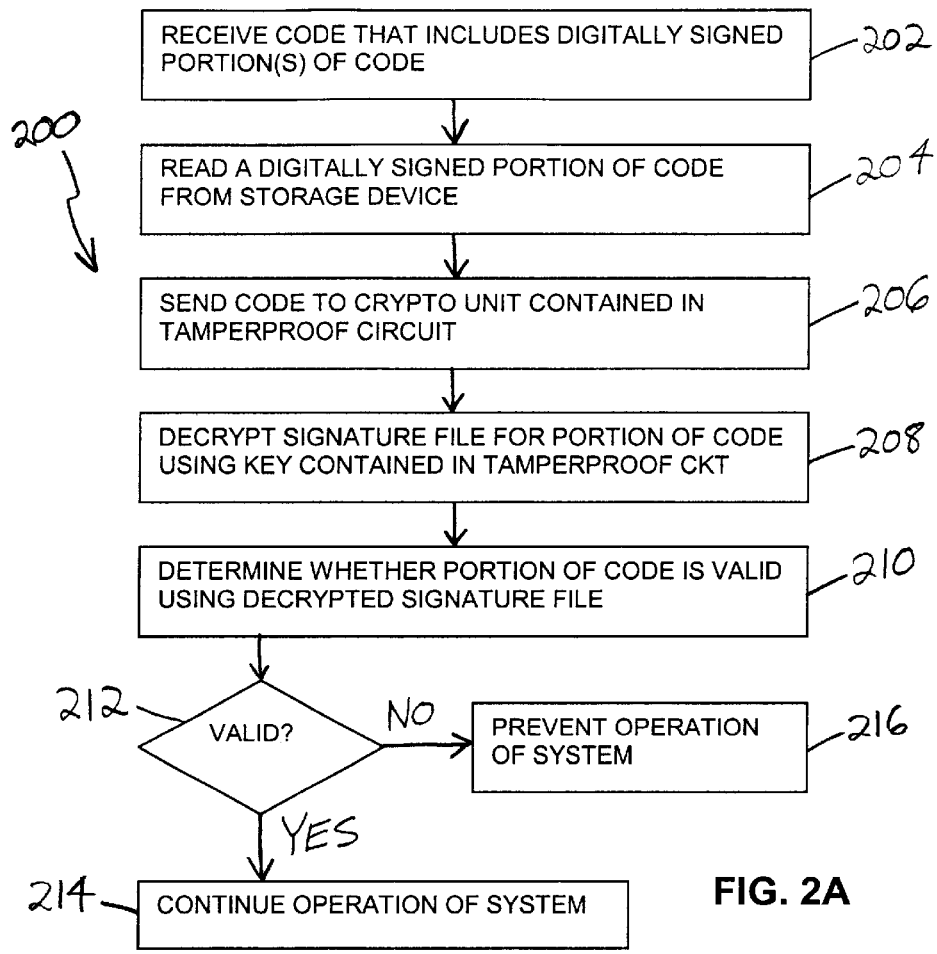
FIGS. 2A and 2B are flowcharts illustrating exemplary methods in accordance with embodiments of the present invention that may be used for operating the system shown in FIG. 1.

FIG. 2A illustrates a method 200 in accordance with an embodiment of the present invention for operating the system 100. The method 200 is useful for verifying the copy protection of software used in the system 100. Prior to the media (e.g. a disc) 108 being inserted into the system 100, at least a portion of the software code for the game is digitally signed with a key, such as PRIVATE KEY$_1$ (FIG. 1). For example, when a game is mastered by a manufacturer, critical portions of the software code may be digitally signed using the key PRIVATE KEY$_1$ known only by the manufacturer. By way of example, portions of code that could be signed are: the disc's Table of Contents, the application itself, executable files, the boot bios, and any other sensitive data that should not be modified by a third party.

Although the contents of the disc 108 could also be encrypted using a unique key, the power of a signed application is that it verifies the integrity of the data signed. Even if the contents of the disc 108 itself were changed by a hacker, the hacker could not correctly generate a valid signature for the new code, because a manufacturer private key is required to do that.

In step 202, software code that includes digitally signed portions of code is received by the system 100. By way of example, the software code may be received by the system 100 by a user inserting the disc 108 into the storage device 102, or by downloading the code from a network and saving the code on the storage device (described below). After the code is received by the system 100, control proceeds to step 204 where the processing circuitry 104 reads a portion of software code from the storage device 102. The portion of software code that is read is preferably one of the portions of code that has been digitally signed with PRIVATE KEY$_1$ prior to the code entering the system 100. In step 206, the processing circuitry 104 sends the portion of software code to the cryptography unit 122 contained in the tamperproof circuit 120. For example, if the portion of software code is the Table of Contents, then the system 100 reads the Table of Contents from the disc 108 and sends it to the cryptography unit 122.

In step 208 the cryptography unit 122 decrypts a signature file corresponding to the portion of the software code using the key PUBLIC KEY$_1$ stored in the tamperproof circuit 120. The key PUBLIC KEY$_1$ will typically be the manufacturers public key and, as mentioned above, can be the same for a substantial number of system units. In step 210 the cryptography unit 122 uses the decrypted signature file to determine whether or not the portion of software code is valid. As indicated by step 212, if the portion of software code is valid, then operation of the system 100 continues as normal as indicated in step 214. On the other hand, if the portion of software code is not valid, then operation of the system 100 is prevented as indicated in step 216. By way of example, operation of the system 100 can be prevented by preventing a boot process of the system 100. Thus, in the scenario where the code is not valid, the system 100 console would attempt to load the doctored disc 108, find that the signature is invalid, and refuse to boot the disc 108. This way, if somebody tries to modify the software on the disc 108, the software will not run on the system 100.

Figure 2B:
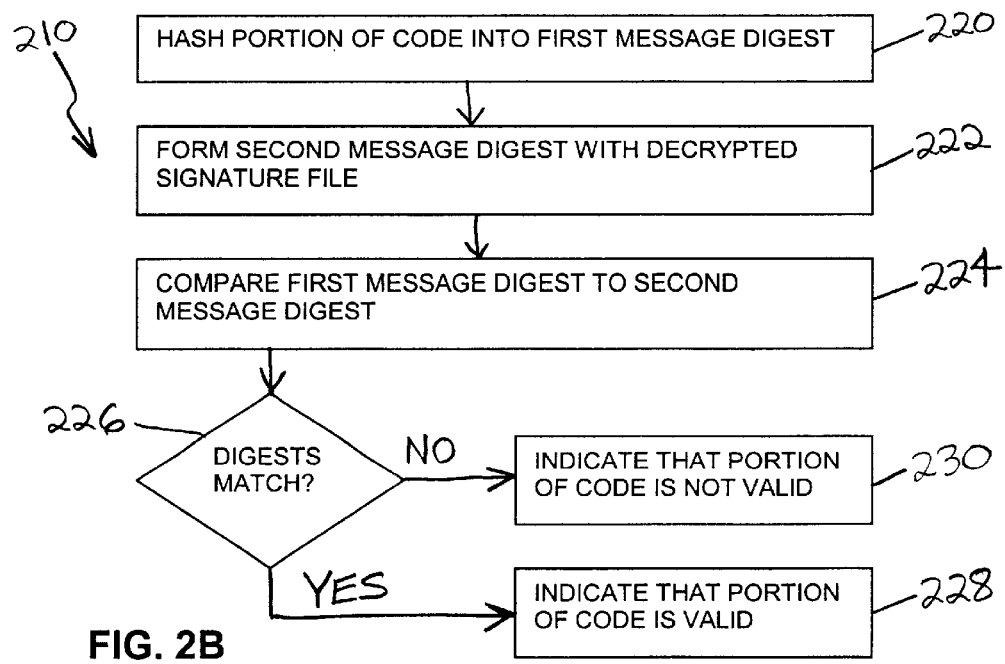

FIG. 2B illustrates an exemplary method in accordance with one embodiment of the present invention for performing step 210 (FIG. 2A), i.e., the step of determining whether or not the portion of software code is valid. Specifically, in step 220 the cryptography unit 122 hashes the portion of software code into a first message digest. That is, if the portion of software code comprises the Table of Contents, then the cryptography unit 122 hashes the Table of Contents into a first message digest. In step 222 the cryptography unit 122 forms a second message digest using the decrypted signature file from the portion of software code. In step 224 the cryptography unit 122 compares the first message digest to the second message digest. As indicated by step 226, if the first message digest matches the second message digest, then the cryptography unit 122 indicates that the portion of code is valid in step 228. On the other hand, if the two digests do not match, then the cryptography unit 122 indicates that the portion of code is not valid in step 230. In other words, if the two digests match, it can be verified that the portion of code, such as the Table of Contents, has not been modified since being digitally signed by the manufacturer, and so the boot process is allowed to continue.

The above process may be repeated for one or more additional portions of software code. Namely, one or more additional portions of software code are read from the storage device 102 with each portion of code having been digitally signed with the key PRIVATE KEY$_1$ prior to entering the storage device 102. The signature files corresponding to the one or more additional portions of software code are decrypted with the cryptography unit 122 using the key PUBLIC KEY$_1$, and operation of the system 100 is prevented if any one or more of the additional portions of software code are not valid.

For example, whenever an executable file is loaded from the disc 108, the loader in the processing circuitry 104 sends the executable file to the cryptography unit 122 to verify whether or not the file is valid. The cryptography unit 122 hashes the executable file into a message digest and decrypts the corresponding signature file with manufacturer's public key, such as PUBLIC KEY$_1$. The cryptography unit 122 compares the created message digest with the decrypted digest, and if the digests match, it can be verified that the executable file has not been modified since being signed by the manufacturer, and the boot process is allowed to continue. If the digests do not match, then the executable file has been modified since being signed by the manufacturer, and operation of the system 100 is prevented, such as by preventing the boot process from continuing. Comparing against a signature file every time an executable portion of code is loaded helps to protect against "swap trick" types of copy protection defeat. This is due to the fact that every bit of executable code that has been digitally signed must be checked for authenticity.

Thus, the above-described process provides significant advantages over conventional software based cryptography systems. Namely, if the key used to decrypt the encrypted data is stored on the disc, this means that it can be found by someone with the means to disassemble the source code found on the disc. However, with the key tucked safely away in the tamperproof hardware 120, it greatly reduces the likelihood of the key being stolen.

Referring again to FIG. 1, it was mentioned above that the storage device 102 may alternatively comprise a hard disc drive. In this scenario, the software code for games or other applications could be downloaded to the system 100 from a network 130, such as for example the Internet or the America Online® network. The downloaded software would be stored on the hard disc drive 102. Such downloading is made possible by the inclusion in the system 100 of a modem 132 that is coupled to the system bus 106. Because the modem 132 and the resulting connection to the network 130 are optional features in this embodiment of the present invention, they are shown in dashed lines.

If the downloading of software to the system 100 is utilized, then one or more portions of software code that have been digitally signed with the key PRIVATE KEY$_1$ can be loaded onto a remote server 134. Or, the remote server 134 could actually perform the process of digitally signing the code. The software could be digitally signed in the same manner described above with respect to the disc 108. The software is then transferred from the remote server 134, across the network 130, and into the system 100 via the modem 132, where it is stored on the hard disc drive 102. If desired, a secure communications channel between the system 100 and the remote server 134 can be established prior to downloading of the software. The secure communications channel can be established by exchanging the system 100's PUBLIC KEY$_2$ and the remote server 134's PUBLIC KEY$_3$, as is well-known in the art. Furthermore, such secure communications channel could be further enhanced through the use of digital certificates, which are an assurance that software downloaded from the Internet comes from a reputable source. A digital certificate provides information about the software, such as the identity of the author and the date on which the software was registered with a certificate authority (CA), as well as a measure of tamper-resistance. The use of digital certificates, however, is not required.

Figure 3:
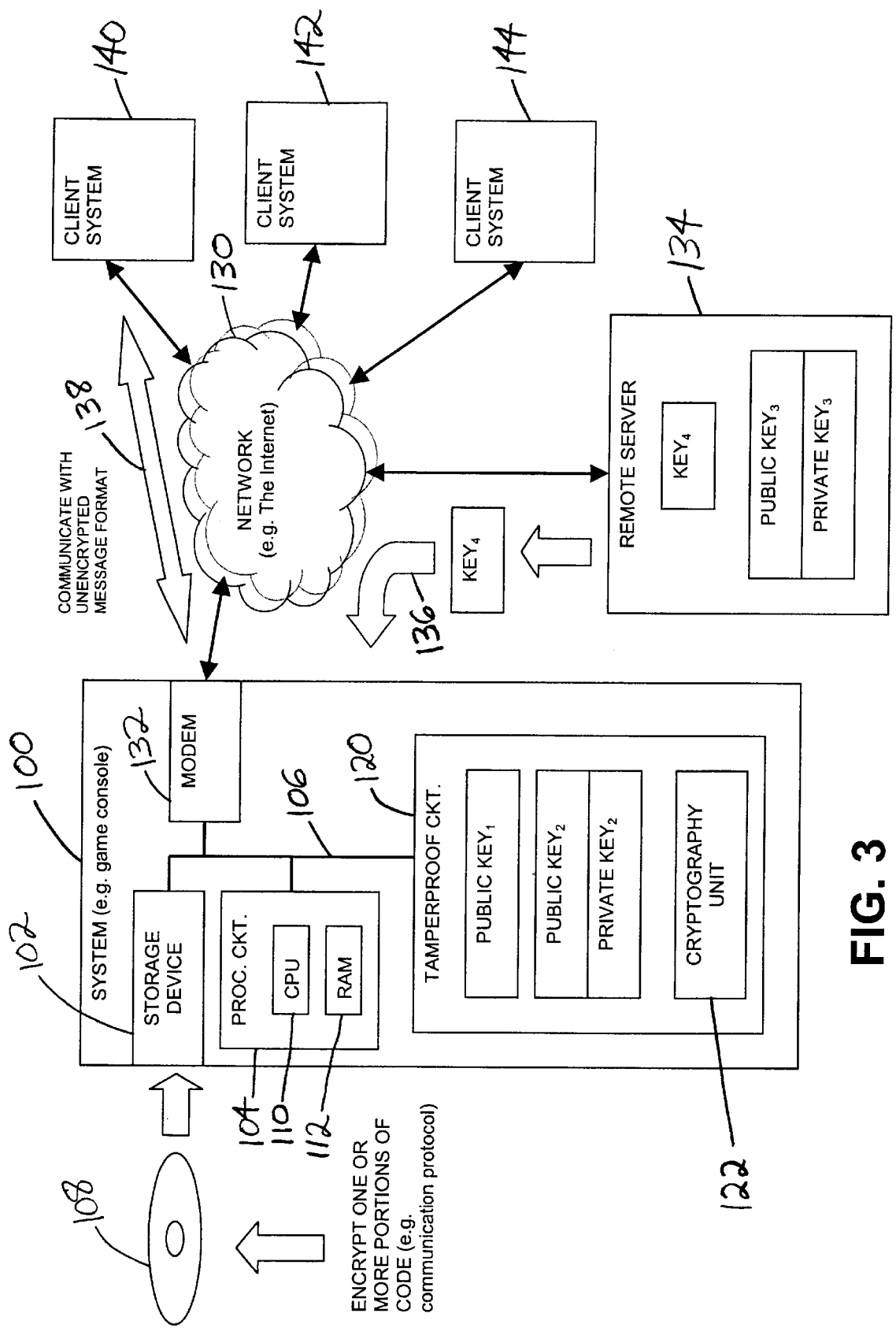
FIG. 3 is a block diagram illustrating a system made in accordance with another embodiment of the present invention.

FIG. 3 illustrates the operation of the system 100 in accordance with another embodiment of the present invention. By using the modem 132 and a hard drive for the storage device 102, the system 100 is capable of maintaining broadband connectivity, allowing for an Internet connection that allows the system 100 to serve as a network platform for e-commerce applications and network gaming capabilities. This allows the user of the system 100 to play games with the users of other client systems across the network 130, such as the client systems 140, 142, 144.

As was mentioned above, however, there is a potential for abuse with respect to online or network enabled game systems, such as so-called "man in the middle" attacks. For example, if the format of the communications protocol used for online gaming is contained on the game disc 108 itself, nothing would stop a hacker from reverse engineering the format from the machine code. Once a hacker obtains the communications protocol, he or she would be able to intercept messages between two systems that are playing a game, which would enable cheating or disruption of play.

The embodiment of the invention illustrated in FIG. 3 takes advantage of the existence of the remote server 134. Namely, in order to coordinate the network games between clients, a server, such as the remote server 134, will typically be used to handle login/mediation of clients. In accordance with the present invention, sensitive portions of the machine code in the game software, such as the code that defines the communications protocol, is encrypted. Upon connection with the remote server 134, a key is sent through a preferably encrypted channel from the remote server 134 to the system 100. The key is then used by the system 100 to decode the communications protocol format. This means that at no time is the communication protocol available to the end-user in its unencrypted format, which prevents a hacker from obtaining it. Thus, this embodiment the system 100 provides the ability to secure sensitive portion of code, such as the communication protocol messages and structures, used in a client/server online game by use of encryption.

Figure 4A:
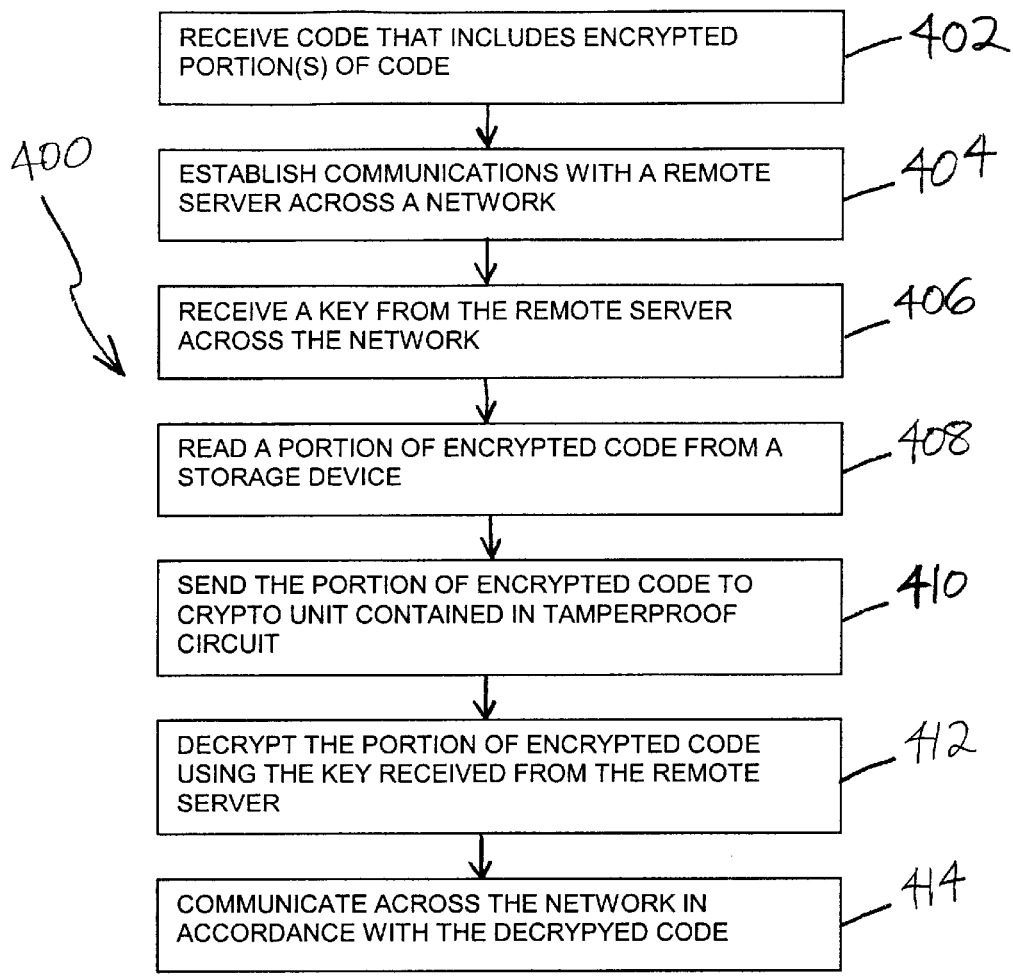
FIGS. 4A and 4B are flowcharts illustrating exemplary methods in accordance with embodiments of the present invention that may be used for operating the system shown in FIG. 3.

FIG. 4A illustrates a method 400 of operating the system 100 in accordance with the embodiment of the present invention illustrated in FIG. 3. Prior to the media (e.g. a disc) 108 being inserted into the system 100, at least a portion of the code that is to be stored on the disc 108 is encrypted. The portion of code that is encrypted preferably comprises the communication protocol that is used for communications that take place during online gaming. The type of encryption that is used may comprise any type of encryption, such as for example, an asymmetric scheme such as public/private key encryption technology, or a symmetric scheme.

In step 402 the system 100 receives code that includes encrypted portions. The code may be received by receiving the disc 108 in the storage device, or by receiving the code through the modem 132 and storing it on a hard drive. In step 404 the system 100 establishes communications with the remote server 134 across the network 130. The remote server 134 typically comprises a server that handles login/mediation of clients for network gaming. The system 100 receives a key, such as $KEY_4$, from the remote server 134 across the network 130 in step 406. This reception is indicated by arrow 136 in FIG. 3. The key $KEY_4$ may comprise any type of key. For example, $KEY_4$ may comprise a public key if an asymmetric scheme is used to encrypt the communications protocol, or $KEY_4$ may comprise a simple symmetric key if a symmetric scheme is used to encrypt the communications protocol.

In step 408 the processing circuitry 104 reads a portion of encrypted code from the storage device 102, and in step 410 the processing circuitry 104 sends the portion of encrypted code to the cryptography unit 122 that is contained in the tamperproof circuit 120. In step 412 the cryptography unit 122 decrypts the portion of the encrypted code using the key received from the remote server 134, in this case $KEY_4$. The decrypted communications protocol message format is stored in a memory, such as the RAM 112. Finally, in step 414 the system 100 begins secure communication with the decrypted communications protocol. Namely, the system 100 uses the decrypted communications protocol for communicating across the network 130 to play games with other systems, such as the system 140 as illustrated by arrow 138 in FIG. 3.

Figure 4B:
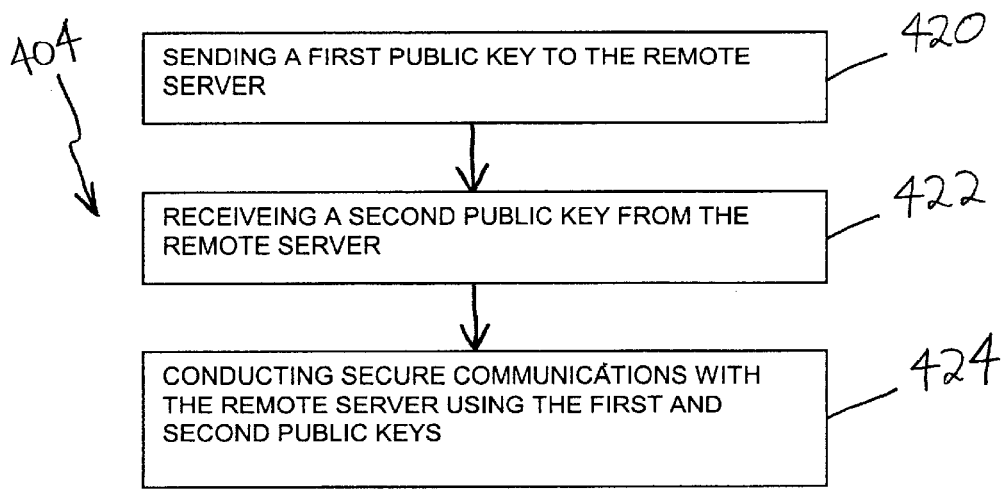

FIG. 4B illustrates an exemplary method in accordance with one embodiment of the present invention for performing step 404, i.e., the step of establishing communications with the remote server 134. This method uses the public/private key pair PUBLIC $KEY_2$/PRIVATE $KEY_2$ stored in the tamperproof circuit 120 of the system 100 and the public/private key pair PUBLIC $KEY_3$/PRIVATE $KEY_3$ stored in the remote server 134 to establish a secure communications channel between the system 100 and the remote server 134. Specifically, in step 420 the system 100 sends its PUBLIC $KEY_2$ to the remote server 134, and in step 422 the system 100 receives the PUBLIC $KEY_3$ from the remote server 134. The system 100 and the server 134 use these keys to negotiate a secure channel, as is well-known in the art. In step 424 the system 100 and the remote server 134 conduct secure communications, and pursuant to step 406 described above, the system 100 receives the key $KEY_4$ from the remote server 134 through the secure communications channel.

As an optional feature of the present invention, the remote server 134, or some other sever, could act as a certificate authority (CA). The certificate authority would have a list of serial numbers for every system, such as the systems 100, 140, 142, 144, that was ever produced by the manufacturer. The certificate authority could also store the unique public key for all of the systems. When one of the systems connects to the certificate authority, the certificate authority could request the system's serial number and positively identify the system by its serial number to verify that it is a legitimate system. After making this positive identification, the certificate authority could then send the correct public key to the system, if appropriate. Having received its public key, the system would then have the ability to play an online game with another system. Namely, it could be made a requirement that before two systems play an online game they must exchange their public keys. This type of hardware identification ("hardware ID"), which is optional, would further impede a hacker's ability to interfere with online communications, such as online gaming.

Thus, by using the method 400 (FIG. 4A) sensitive portions of code, such as the communication protocol message format, are not available to the end-user in their unencrypted format. This means that a hacker intercepting a message that is being communicated between two systems will be unable to decipher it and will be unable to replace the message with a different message. Theoretically, a hacker could, if he or she were able to get past the digital signature described above, or had the means to access the RAM 112 directly on the running system 100, get the key $KEY_4$ from the RAM 112. However, this is considerably more difficult than disassembling the source code from a disc that is capable of being read on a personal computer.

It was mentioned above that the tamperproof circuit 120 could alternatively be implemented as an external or "add-on" component, such as a memory card or PCMCIA card. Referring to FIG. 5A, there is illustrated a version of the system 100 in accordance with another embodiment of the present invention wherein the tamperproof circuit 120 is implemented as a removable card-like device, such as a PC card or PCMCIA card. In this embodiment the tamperproof circuit 120 can be easily inserted and removed from an interface slot 160 in the system 100. The interface slot 160 will typically be coupled to the system bus 106.

Referring to FIG. 5B, there is illustrated a version of the system 100 in accordance with another embodiment of the present invention wherein the tamperproof circuit 120 is implemented as an external component. The tamperproof circuit 120 is coupled to the system 100 by means of a cable 164 and an interface 166. The interface 166, which is coupled to the system bus 106, may comprise many different types of interfaces, such as for example Universal Serial Bus (USB) or i.LINK® (IEEE 1394).

Figure 5C:
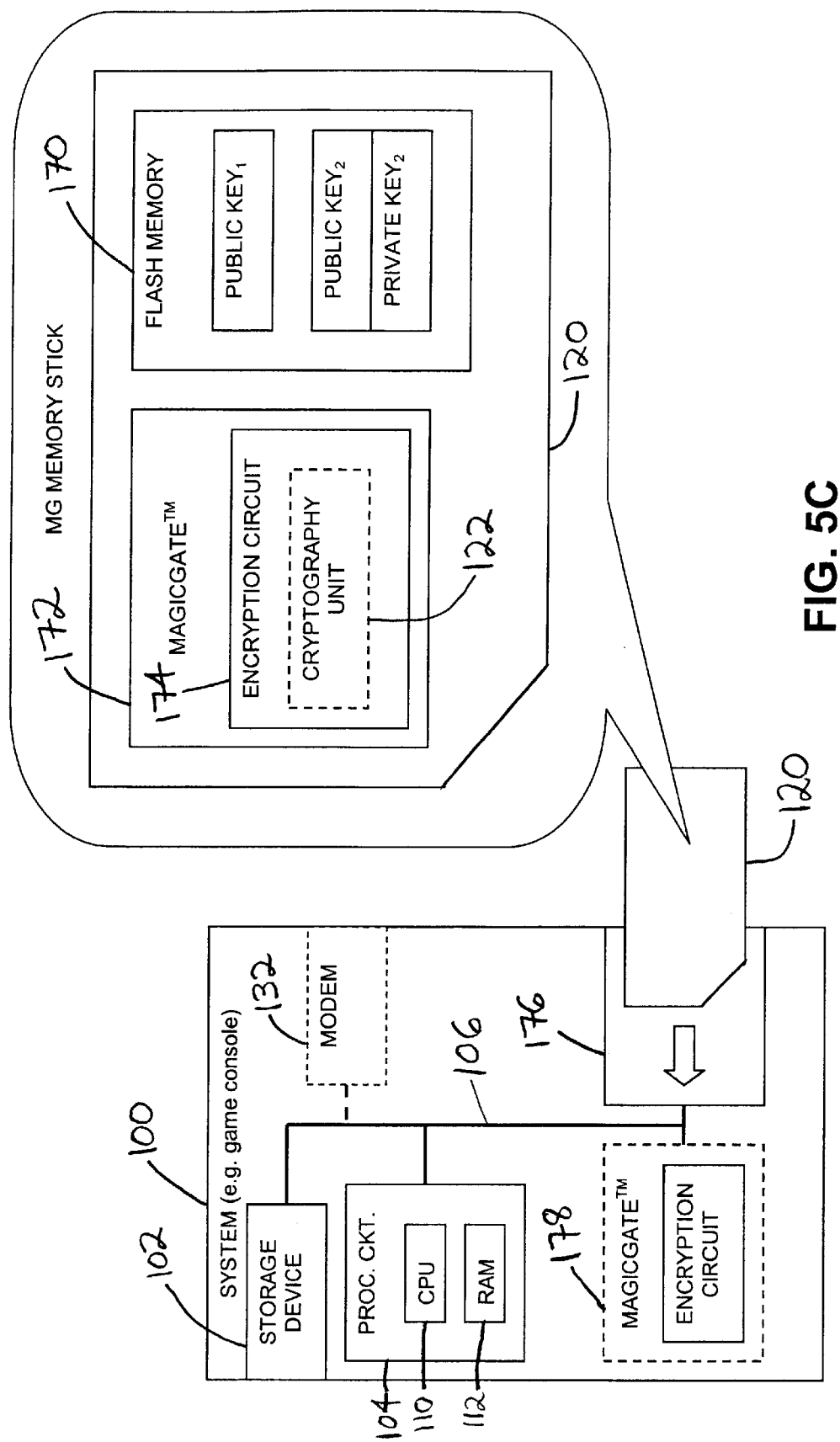

Referring to FIG. 5C, there is illustrated a version of the system 100 in accordance with another embodiment of the present invention wherein the tamperproof circuit 120 is implemented on a small card-like media, such as for example using Sony MagicGate™ Memory Stick® technology. MagicGate™ Memory Stick® media incorporates MagicGate technology, which is an innovative music copyright protection technology. The MagicGate™ Memory Stick® media includes an on-board flash memory 170 and a MagicGate™ circuit 172 that includes an encryption circuit 174. The MagicGate™ Memory Stick® media interfaces with the system 100 by means of a media slot 176 that would typically be coupled to the system bus 106. As an optional feature the system 100 could also include its own MagicGate™ circuit 178, meaning that the system 100 could function as an MG appliance in accordance with MagicGate technology.

In accordance with an embodiment of the present invention, the encryption circuit 174 in the MagicGate™ Memory Stick® media could provide the functions of the cryptography unit 122 described above. Furthermore, the on-board flash memory 170 in the MagicGate™ Memory Stick® media could be used to store the keys described above, namely, PUBLIC $KEY_1$ and PUBLIC $KEY_2$/ PRIVATE $KEY_2$. This way, the MagicGate™ Memory Stick® media is capable of providing substantially the same functionality as the tamperproof circuit 120 described above.

The MagicGate™ Memory Stick® media is believed to include a certain level of tamperproof protection, and if necessary, this level of tamperproof protection could be increased for added protection. Furthermore, the MagicGate™ circuit 178 in the system 100, if included, could be used in accordance with MagicGate technology to authenticate that a valid MagicGate™ Memory Stick® media has been inserted into the media slot 176. Thus, any tampering with the media could be detected by the MagicGate™ circuit 178, which could prevent operation of the system 100 with that particular piece of media.

It should be well-understood that the MagicGate™ Memory Stick® media is just one example of an external, removable card-like device that may be used for implementing the tamperproof circuit 120 described herein. By way of further example, the tamperproof circuit 120 could also be implemented on the memory card used for the Sony PlayStation® 2.

Figure 6:
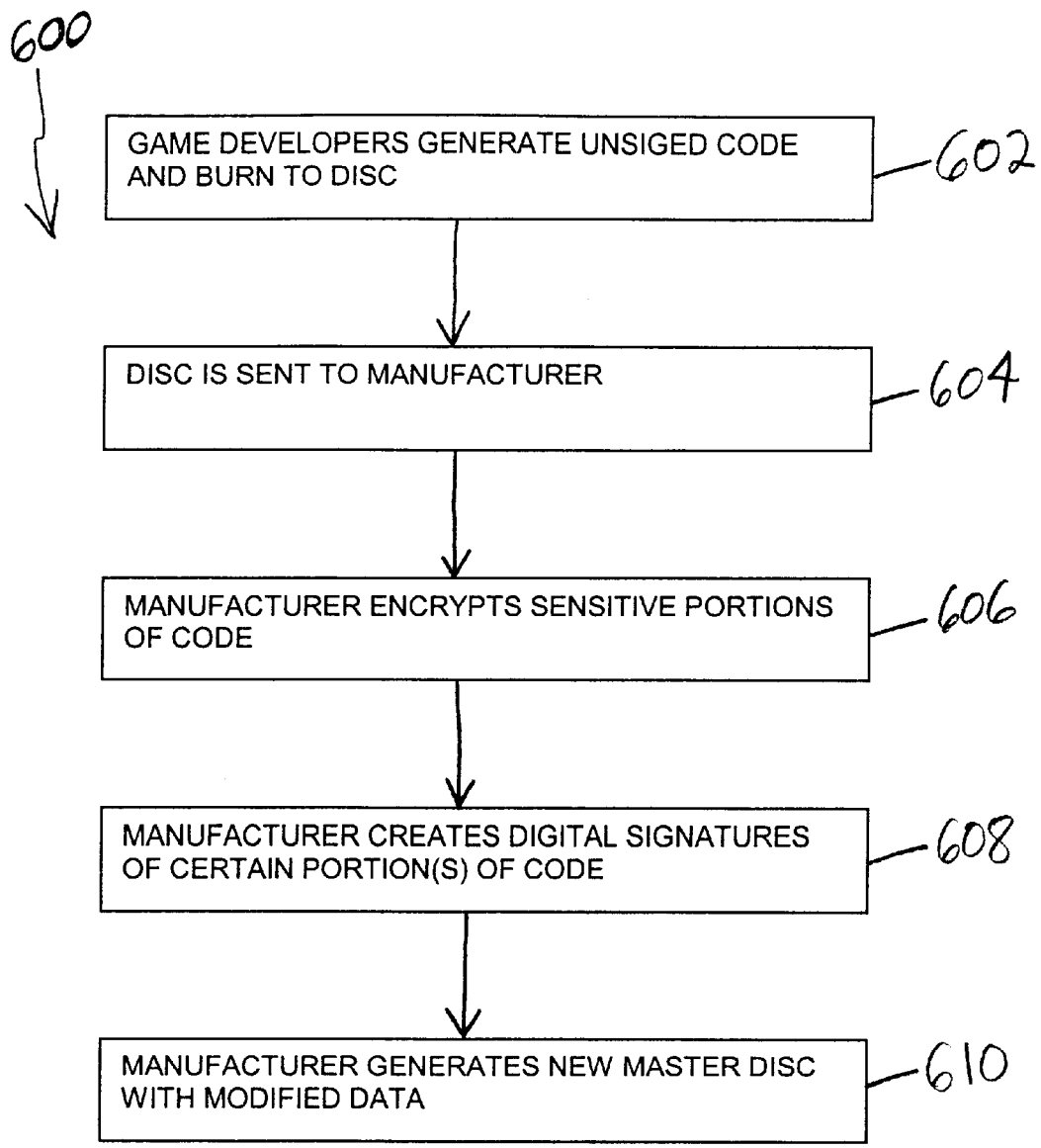
FIG. 6 is a flowchart illustrating a mastering process in accordance with an embodiment of the present invention.

Referring to FIG. 6, there is illustrated a mastering process 600 in accordance with an embodiment of the present invention. The mastering process 600 can be used to create computer readable media, such as DVDs or CDs, that are capable of taking advantage of above-described methods. Specifically, in step 602 game developers generate unsigned code and burn the code to disc, e.g. either DVD or CD. In step 604 the disc is sent to a manufacturer. In step 606 the manufacturer encrypts sensitive portions of the code, such as the communications protocol. The sensitive portions of the code may be specified by the game developers. In step 608 the manufacturer creates digital signatures for certain portions of the code using a private key. Portions of the code that may be digitally signed include the Table of Contents, one or more of the executable files, etc. Finally, in step 610 the manufacturer generates a new master disc with the modified data.

As described above, the system 100 is capable of decreasing the threat of piracy and reverse engineering by using an associated tamperproof circuit that contains a cryptography unit and one or more keys. By using the cryptography unit and one of the keys contained in the tamperproof circuit to decrypt a signature file for a portion of received software code, operation of the system 100 can be prevented for code that has been improperly modified or doctored. The tamperproof circuit will significantly hinder a hacker's ability to obtain the keys or the algorithm used to do the actual decryption. Furthermore, the tamperproof circuit can be used to hinder a hacker's ability to interfere with online communications, such as online gaming. Namely, one or more portions of the code received by the system 100, such as a communications protocol, may be encrypted prior to receipt of the code by the system 100. The system 100 can connect to a remote server that is used to coordinate the online gaming and obtain a key that can be used by the cryptography unit contained in the tamperproof circuit to decrypt the communications protocol. The system then uses the communications protocol to communicate across a network with another client, such as to play an online game. Because a hacker does not have access to the unencrypted communications protocol, the hacker's ability to interfere with the online game is substantially diminished.

While the invention herein disclosed has been described by means of specific embodiments and applications thereof, numerous modifications and variations could be made thereto by those skilled in the art without departing from the scope of the invention set forth in the claims.

What is claimed is:

1. A method of operating a system, comprising the steps of:

reading a portion of software code from a storage device in the system, wherein the portion of software code has been digitally signed with a first key prior to entering the system;

sending the portion of the software code to a cryptography unit contained in a tamperproof circuit associated with the system;

decrypting a signature file corresponding to the portion of the software code with the cryptography unit using a second key stored in the tamperproof circuit to form a decrypted signature file;

determining whether the portion of the software code is valid by using the decrypted signature file;

preventing operation of the system if the portion of the software code is not valid;

receiving a third key from a server across a network;

reading a portion of encrypted code from the storage device; and decrypting the portion of the encrypted code with the cryptography unit using the third key.

2. A method in accordance with claim 1, wherein the tamperproof circuit comprises an internal tamperproof circuit that is hard wired into the system.

3. A method in accordance with claim 1, wherein the tamperproof circuit comprises an external tamperproof circuit.

4. A method in accordance with claim 1, wherein the tamperproof circuit comprises a card-like removable tamperproof circuit.

5. A method in accordance with claim 1, wherein the step of determining whether the portion of the software code is valid comprises the steps of:

hashing the portion of the software code into a first message digest;

forming a second message digest with the decrypted signature file;

comparing the first message digest to the second message digest; and indicating that the portion of the software code is not valid if the first message digest and the second message digest do not match.

6. A method in accordance with claim 1, wherein the storage device comprises removable computer readable media that has the software code stored thereon.

7. A method in accordance with claim 1, wherein the storage device comprises a hard disc drive that has the software code stored thereon.

8. A method in accordance with claim 1, further comprising the step of:
digitally signing at least the portion of the software code with the first key prior to the software code being received by the system.

9. A method in accordance with claim 1, further comprising the steps of:
reading one or more additional portions of software code from the storage device that have each been digitally signed with the first key prior to entering the system;
decrypting signature files corresponding to the one or more additional portions of software code with the cryptography unit using the second key; and
preventing operation of the system if any one or more of the additional portions of software code are not valid.

10. A method in accordance with claim 1, wherein the portion of the encrypted code comprises a communication protocol configured for communicating across the network.

11. A method in accordance with claim 10, further comprising the step of:
communicating across the network using the communication protocol.

12. A method in accordance with claim 1, further comprising the steps of:
establishing a secure communication channel with the server across the network prior to the step of receiving a third key; and
receiving the third key from the server through the secure communication channel.

13. A processor based system, comprising:
a storage device;
a tamperproof circuit;
a cryptography unit contained in the tamperproof circuit; and
processing circuitry configured to read a portion of software code from the storage device that has been digitally signed with a first key prior to entering the system, and to send the portion of the software code to the cryptography unit;
wherein the cryptography unit is configured to decrypt a signature file corresponding to the portion of the software code using a second key stored in the tamperproof circuit, and to determine whether the portion of the software code is valid;
wherein the processing circuitry is further configured to prevent operation of the system if the portion of the software code is not valid;
wherein the processing circuitry is further configured to receive a third key from a server across a network and read a portion of encrypted code from the storage device, and wherein the cryptography unit is further configured to decrypt the portion of the encrypted code unit using the third key.

14. A processor based system in accordance with claim 13, wherein the tamperproof circuit comprises an internal tamperproof circuit that is hard wired into the system.

15. A processor based system in accordance with claim 13, wherein the tamperproof circuit comprises an external tamperproof circuit.

16. A processor based system in accordance with claim 13, wherein the tamperproof circuit comprises a card-like removable tamperproof circuit.

17. A processor based system in accordance with claim 13, wherein the cryptography unit is configured to determine whether the portion of the software code is valid by hashing the portion of the software code into a first message digest, forming a second message digest with the decrypted signature file, comparing the first message digest to the second message digest, and indicating that the portion of the software code is not valid if the first message digest and the second message digest do not match.

18. A processor based system in accordance with claim 13, wherein the storage device comprises removable computer readable media that has the software code stored thereon.

19. A processor based system in accordance with claim 13, wherein the storage device comprises a hard disc drive that has the software code stored thereon.

20. A processor based system in accordance with claim 13, wherein the processing circuitry is further configured to read one or more additional portions of software code from the storage device that have each been digitally signed with the first key prior to entering the system, decrypt signature files corresponding to the one or more additional portions of software code with the cryptography unit using the second key, and prevent operation of the system if any one or more of the additional portions of software code are not valid.

21. A processor based system in accordance with claim 13, wherein the portion of the encrypted code comprises a communication protocol configured for communicating across the network.

22. A processor based system in accordance with claim 21, wherein the processing circuitry is further configured to communicate across the network using the communication protocol.

23. A method of operating a system, comprising the steps of:
receiving a first key in the system from a server across a network;
reading a portion of encrypted code from a storage device in the system;
sending the portion of the encrypted code to a cryptography unit contained in a tamperproof circuit associated with the system;
decrypting the portion of the encrypted code with the cryptography unit using the first key to form decrypted code;
communicating across the network using the decrypted code;
reading a portion of software code from the storage device that has been digitally signed with a second key prior to entering the system; and
decrypting a signature file corresponding to the portion of the software code with the cryptography unit using a third key stored in the tamperproof circuit.

24. A method in accordance with claim 23, wherein the decrypted code comprises a communication protocol configured for communicating across the network.

25. A method in accordance with claim 23, further comprising the steps of:
establishing a secure communication channel with the server across the network prior to the step of receiving a first key; and receiving the first key from the server through the secure communication channel.

26. A method in accordance with claim 25, wherein the step of establishing a secure communication channel with the server across the network comprises the step of:

using a private/public key pair stored in the tamperproof circuit to establish the secure communication channel.

27. A method in accordance with claim 23, wherein the tamperproof circuit comprises an internal tamperproof circuit that is hard wired into the system.

28. A method in accordance with claim 23, wherein the tamperproof circuit comprises an external tamperproof circuit.

29. A method in accordance with claim 23, wherein the tamperproof circuit comprises a card-like removable tamperproof circuit.

30. A method in accordance with claim 23, further comprising the steps of:

determining whether the portion of the software code is valid by using the decrypted signature file; and preventing operation of the system if the portion of the software code is not valid.

31. A processor based system, comprising:

a storage device;

a tamperproof circuit;

a cryptography unit contained in the tamperproof circuit; and processing circuitry configured to receive a first key from a server across a network, read a portion of encrypted code from the storage device, and send the portion of the encrypted code to the cryptography unit;

wherein the cryptography unit is configured to decrypt the portion of the encrypted code using the first key to form decrypted code;

wherein the processing circuitry is further configured to communicate across the network using the decrypted code, wherein the processing circuitry is further configured to read a portion of software code from the storage device that has been digitally signed with a second key prior to entering the system and to send the portion of the software code to the cryptography unit, and wherein the cryptography unit is further configured to decrypt a signature file corresponding to the portion of the software code using a third key stored in the tamperproof circuit and to determine whether the portion of the software code is valid.

32. A processor based system in accordance with claim 31, wherein the tamperproof circuit comprises an internal tamperproof circuit that is hard wired into the system.

33. A processor based system in accordance with claim 31, wherein the tamperproof circuit comprises an external tamperproof circuit.

34. A processor based system in accordance with claim 31, wherein the tamperproof circuit comprises a card-like removable tamperproof circuit.

35. A processor based system in accordance with claim 31, wherein the decrypted code comprises a communication protocol configured for communicating across the network.

36. A processor based system in accordance with claim 31, wherein the processing circuitry is further configured to establish a secure communication channel with the server across the network and to receive the first key from the server through the secure communication channel.

37. A processor based system in accordance with claim 36, wherein the processing circuitry is further configured to use a private/public key pair stored in the tamperproof circuit to establish the secure communication channel.

38. A processor based system in accordance with claim 31, wherein the processing circuitry is further configured to prevent operation of the system if the portion of the software code is not valid.

* * * * *

UNITED STATES PATENT AND TRADEMARK OFFICE
CERTIFICATE OF CORRECTION

PATENT NO. : 6,782,477 B2
DATED : August 24, 2004
INVENTOR(S) : McCarroll, William M.

It is certified that error appears in the above-identified patent and that said Letters Patent is hereby corrected as shown below:

<u>Title page,</u>
Item [73], Assignee, please change "Song Computer Entertainment America Inc." to
-- Sony Computer Entertainment America Inc. --.

Signed and Sealed this

Second Day of August, 2005

JON W. DUDAS
*Director of the United States Patent and Trademark Office*